Sept. 29, 1964  R. ROSE ETAL  3,150,466
BRICK CLADDING

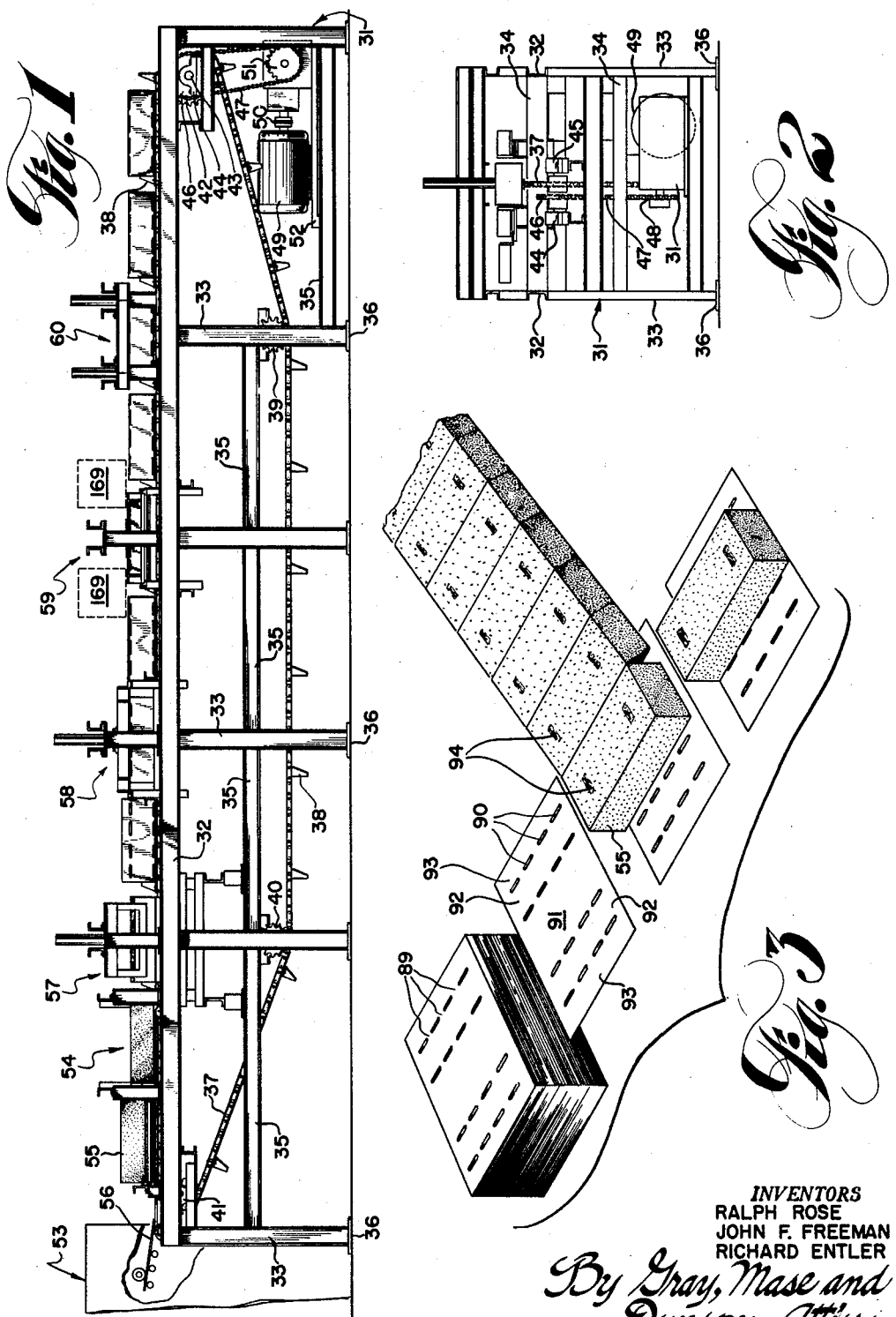

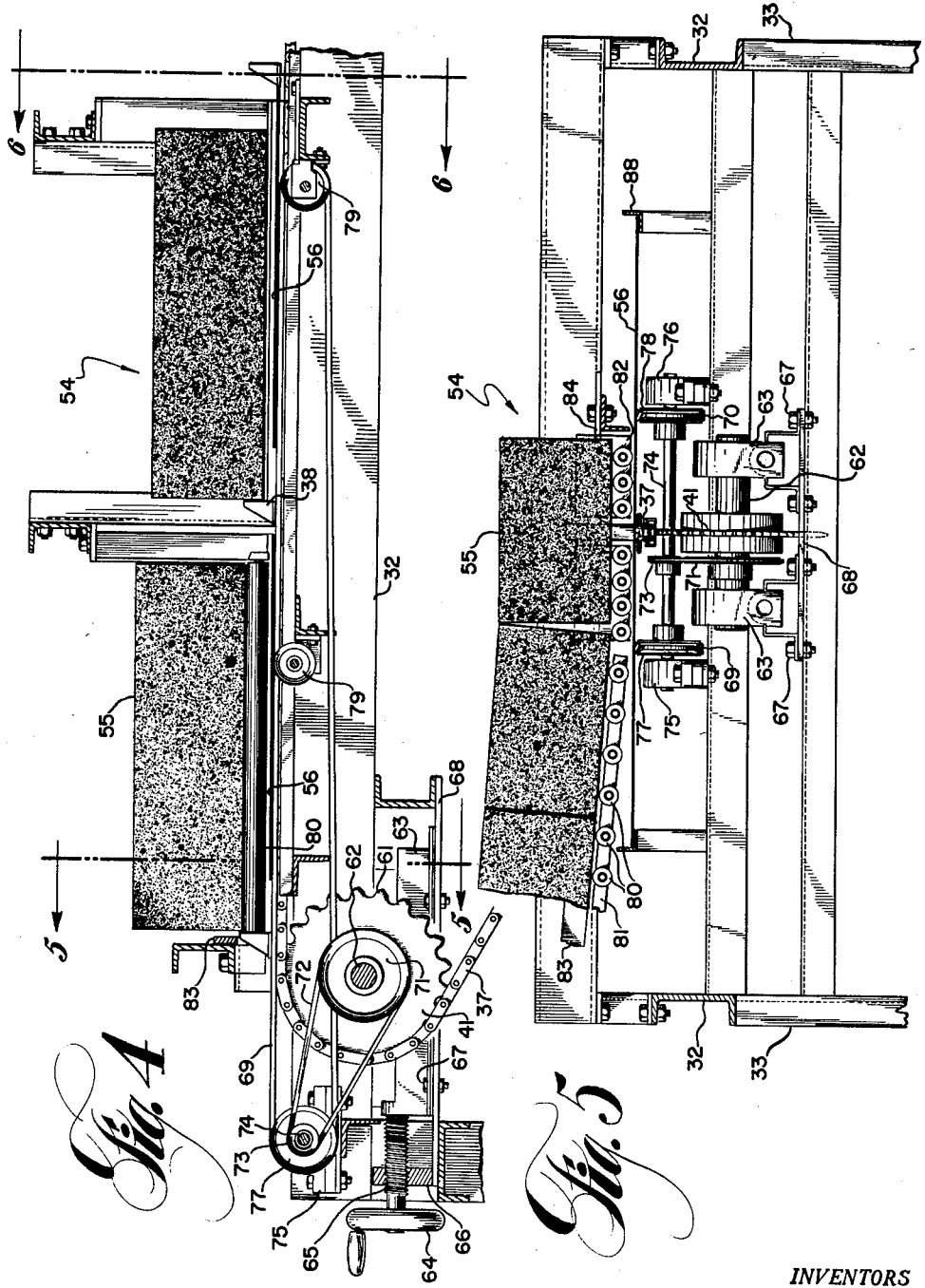

Filed Sept. 25, 1959  10 Sheets-Sheet 3

INVENTORS
RALPH ROSE
JOHN F. FREEMAN
RICHARD ENTLER
By Gray, Mase and
Dunson - Attys.

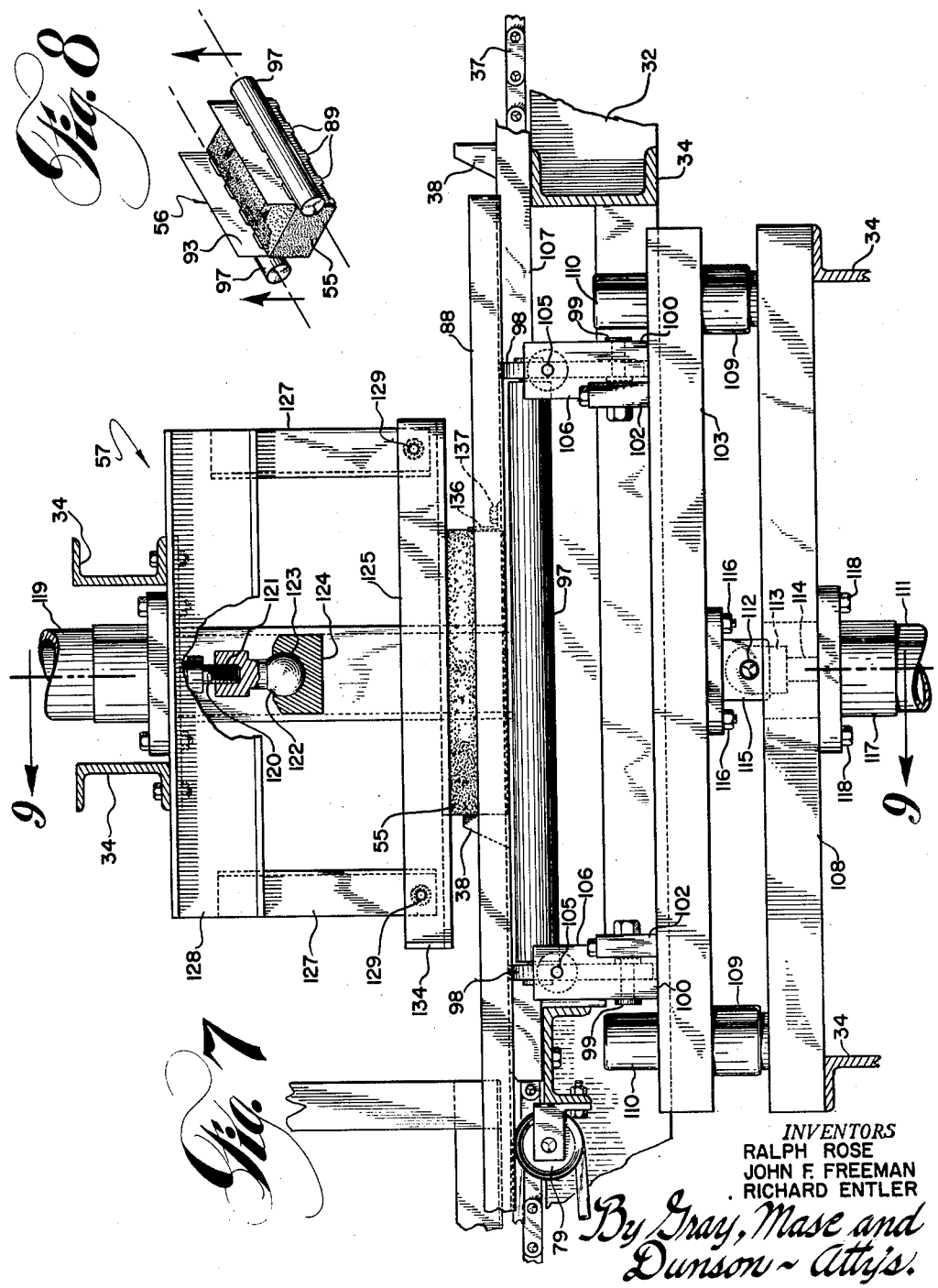

Sept. 29, 1964   R. ROSE ETAL   3,150,466
BRICK CLADDING
Filed Sept. 25, 1959   10 Sheets-Sheet 5

INVENTORS
RALPH ROSE
JOHN F. FREEMAN
RICHARD ENTLER
By Gray, Mase and
Dunson — Attys.

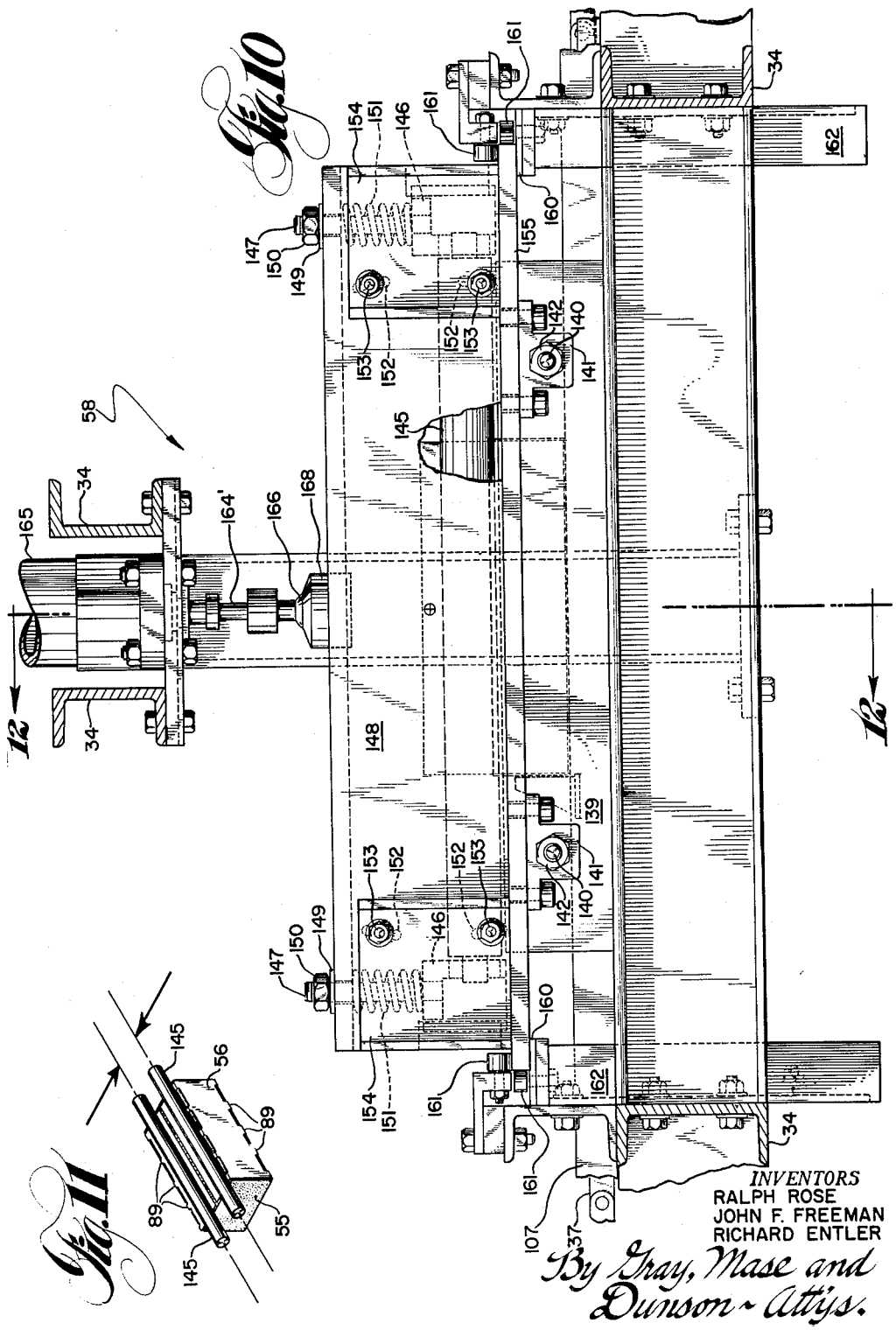

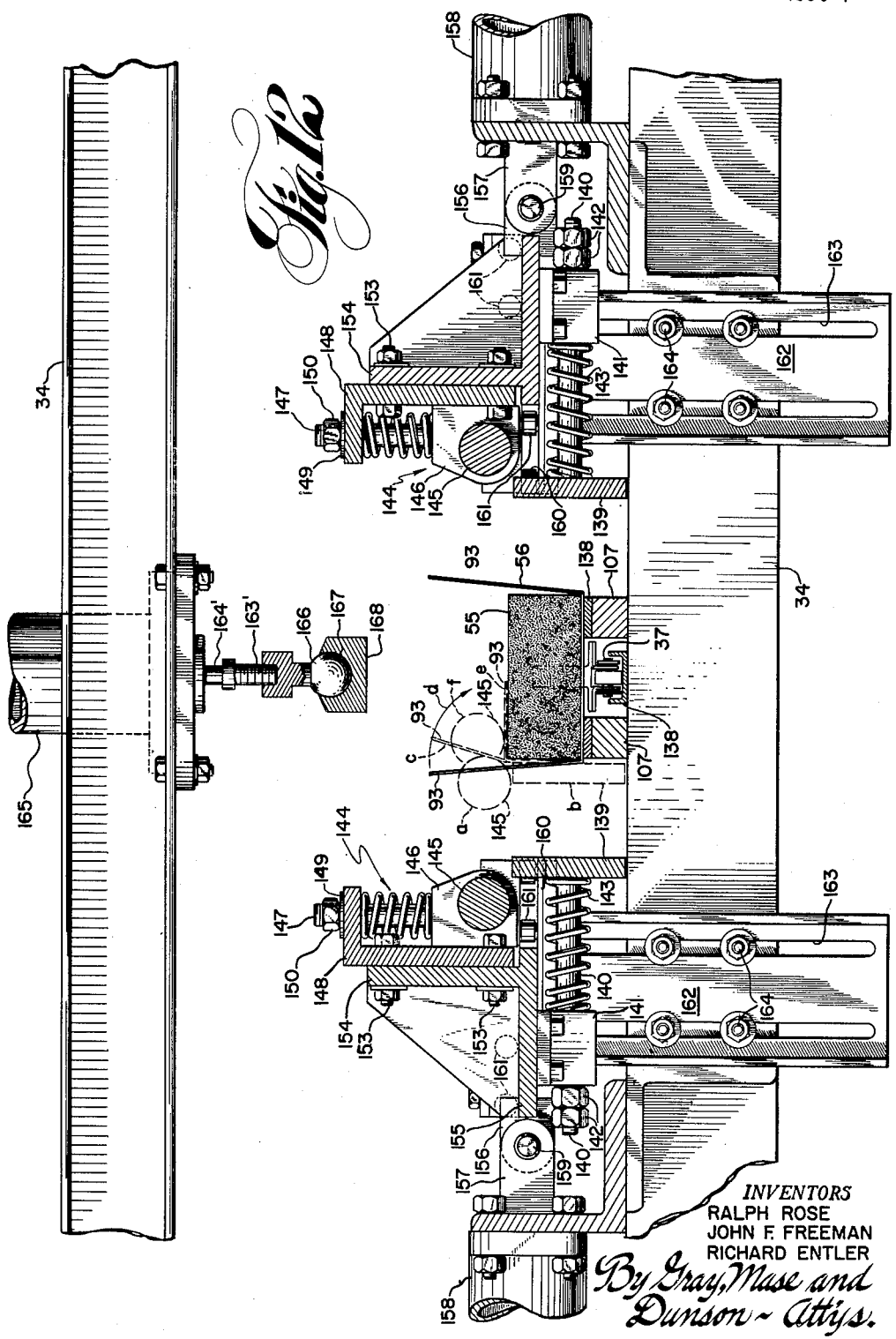

Sept. 29, 1964   R. ROSE ETAL   3,150,466
BRICK CLADDING
Filed Sept. 25, 1959   10 Sheets-Sheet 8

INVENTORS
RALPH ROSE
JOHN F. FREEMAN
RICHARD ENTLER
By Gray, Mase and
Dunson - Attys.

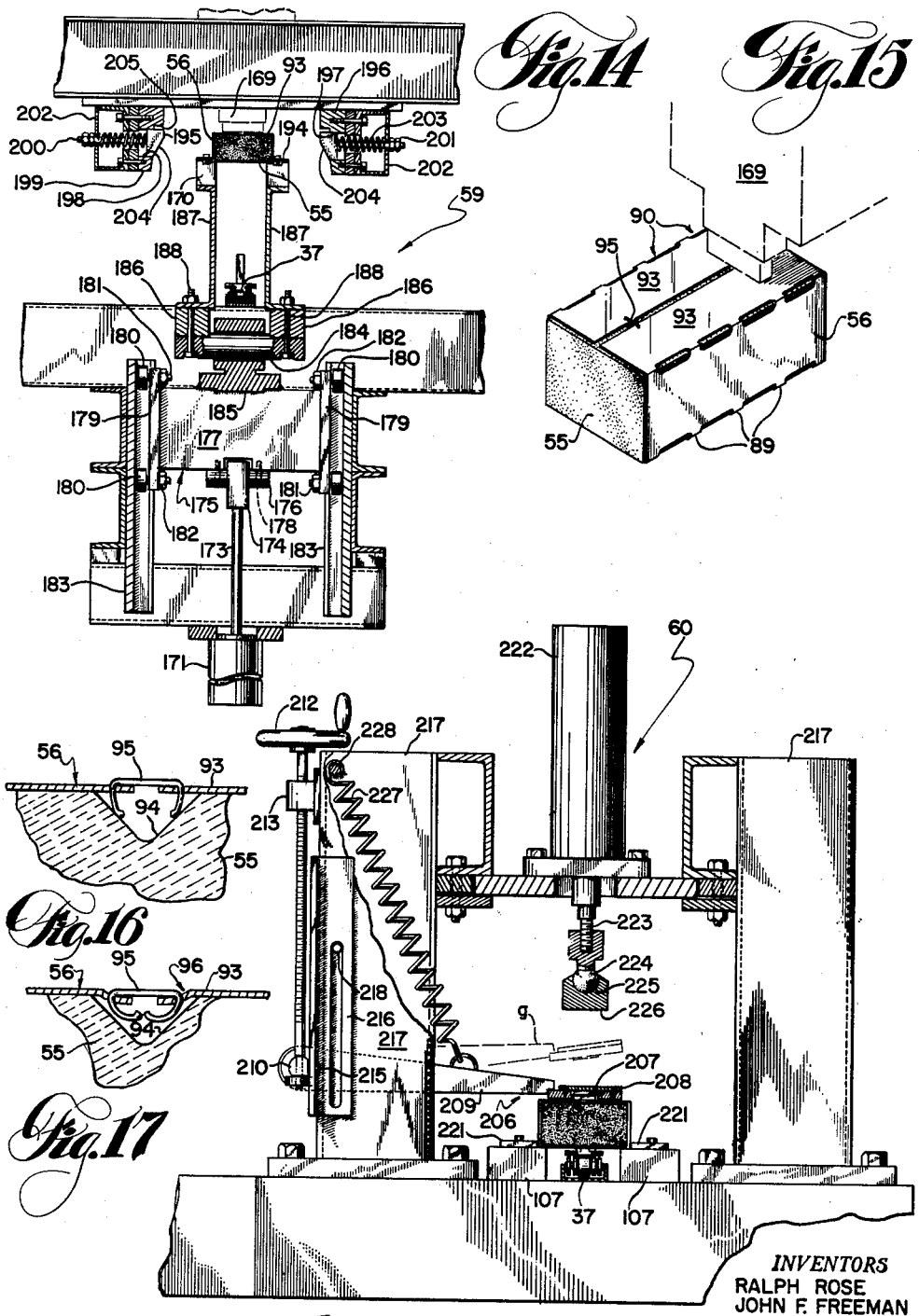

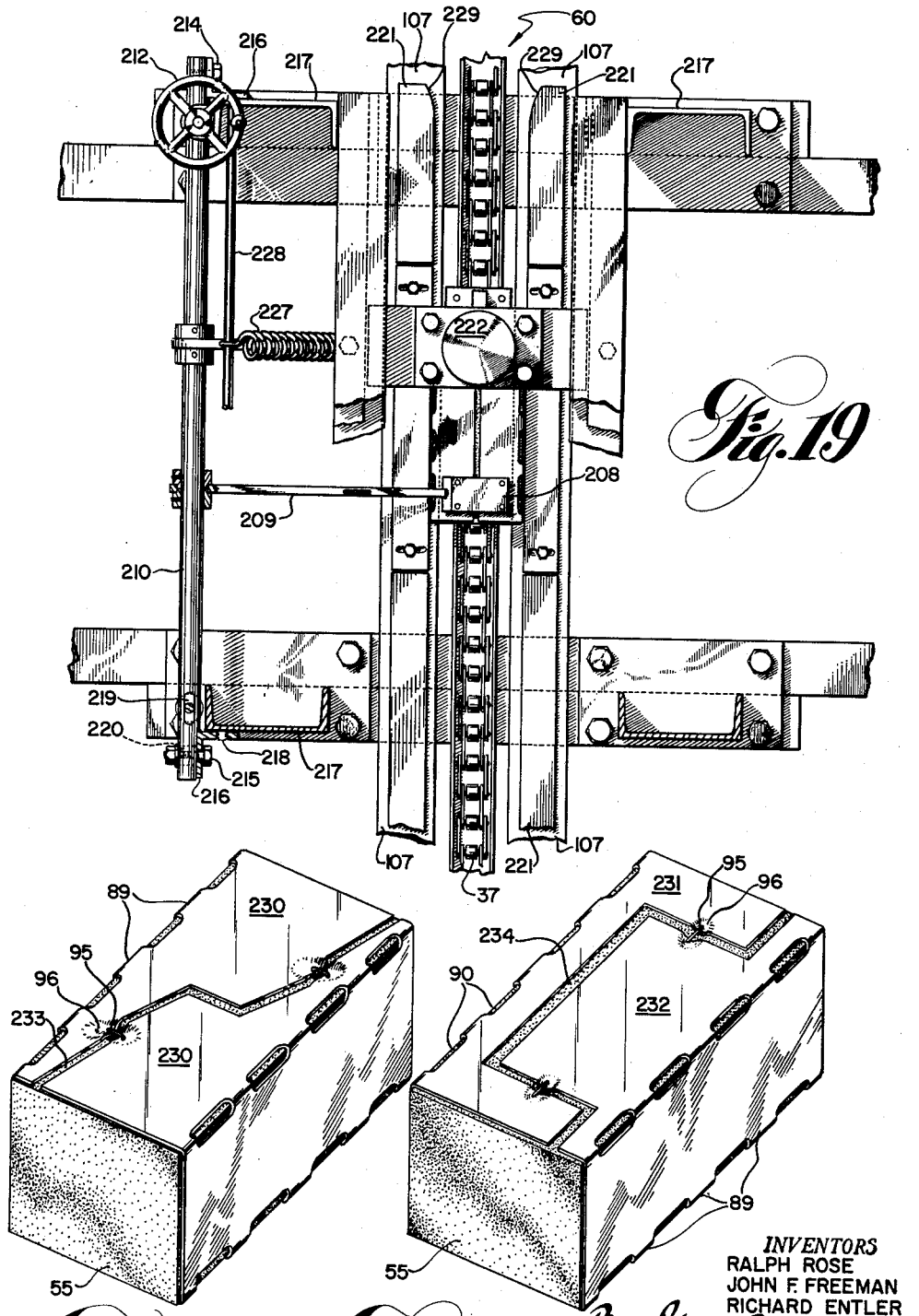

United States Patent Office 3,150,466
Patented Sept. 29, 1964

3,150,466
BRICK CLADDING
Ralph Rose, Pittsburgh, Pa., and John F. Freeman, Worthington, and Richard W. Entler, Columbus, Ohio, assignors, by direct and mesne assignments, to H. K. Porter Company, Inc., Pittsburgh, Pa., a corporation of Pennsylvania
Filed Sept. 25, 1959, Ser. No. 842,328
3 Claims. (Cl. 50—413)

This invention relates to metal-clad refractory articles, such as brick and other shapes, used in the construction of furnaces and like structures exposed to high temperatures and to apparatus for applying metal cases to refractory brick.

Metal-clad refractory bricks are well known and extensively used in industrial furnaces. The metal cases of composite block have a number of different forms, such as rectangular metal boxes, L-shapes, and plates, secured to the brick surfaces. When a furnace constructed of such composite block is fired or heated, the heat brings about an oxidation of the adjoining metal cases so that they bond themselves together and also to the basic refractory brick that they enclose.

Composite metal-clad refractories have been made in a number of ways, all of which have had some unfavorable aspects.

One of the earliest methods consisted of hand filling and ramming refractory mixes into hollow, open-end preformed metal cases of the desired weight, size, and shape. This was slow, costly, and often resulted in refractories of nonuniform density. In addition, the method was applicable only to the production of unburned refractories.

An improvement on the above method for unburned refractories is the technique known as "comolding." In this method, a preshaped metal case, usually in the shape of a U-channel, is placed in the mold of a brick press with the open side of the U up, filled with loose refractory mix and the mix and case pressed together to form a composite block. Most such cases have inwardly projecting lugs or fingers which are secured within the compacted brick mix and which hold the case to the brick. This method has several inherent disadvantages among which are: the method is applicable only to unburned brick and producers using this method must have another method for applying cases to unburned brick; production of brick at the press is slowed by the necessity of inserting and aligning the cases for each pressing cycle; and cluttering of the press area by the storage of bulky preformed cases and the congestion caused by traffic in the press area.

A third method of cladding applicable to both burned and chemically bonded brick consists of cladding the formed brick with one or more substantially U-shaped, preformed metal channels secured to the brick by adhesives, punching the case into the brick, welding of two cases together, and/or by the normal clamping action of the metal case. Some of the disadvantages of this method are the large storage space requirements for the preformed case and the "fit" problem encountered when trying to obtain a close relationship between a case made "to size" and the normal occurring variation in the size of brick. The problem is particularly acute in the instance of cladding burned brick. Such conditions often result in brick being "loose" within the case or in the case being "bowed" by the insertion of an oversized brick.

A recently developed method of metal cladding chemically bonded and burned brick uses a separate flat sheet of metal for each surface to be clad, the sheets being adhesively secured to the brick. This method overcomes the objection of large storage requirements for preformed cases but results in the handling of an excessive number of sheets per brick. In addition, a close "fit" between metal and brick is never achieved because of the intervening adhesive. Further, many adhesives soften under the influence of temperatures only slightly above normal, such as might occur in the vicinity of an operating furnace, with a resultant displacement of the metal sheets relative to the brick.

An important consideration in applying metal cases to refractory brick is anchoring or affixing the metal to the brick. In handling of the bricks, that is during shipping and use of the bricks in construction of furnaces, it is important that some provision be made to ensure that the bricks do not slip out of the metal cases. If the bricks are not positively held inside the cases and thus fall out, they may be damaged or broken. Even if the bricks are not damaged on falling out of the metal case, it is both time-consuming and difficult for those persons handling the bricks to reinsert the bricks into their cases. There is also danger of injury from the bricks falling on the handlers, since the bricks are quite heavy, and many of them have rather sharp corners.

The present invention obviates the previously described disadvantages of other metal-clad brick and metal-cladding methods.

Briefly, this invention includes a basic refractory brick having sheet metal enclosing four surfaces of the brick with the opposite end surfaces of the brick not covered with metal. Perforations through the metal are provided at the corners of the brick along the line where the metal is bent. The sheet metal is held in place by staples which bridge and hold in place the opposite ends of the metal that is wrapped around the brick. The metal adjacent to the staple is depressed or dimpled inwardly enough to position the top of the staple so that it is within the outer surface of the metal case—that is inside, or at least flush with, said outer surface.

In accordance with this invention, a conveyor is provided for carrying sheet metal blanks and bricks through a machine where various operations are performed to encase the brick in sheet metal. Sheet metal blanks and bricks are fed onto the conveyor so that one brick is positioned on top of each sheet metal blank. The conveyor moves intermittently causing the brick and sheet metal to pause at various stations where various operations take place. The machine is arranged so that there are five stations. The first station is the brick and metal cladding blank orientation portion of the apparatus. The second station bends the sheet metal upward around the sides of the brick by the "wiping" action of hydraulically activated rollers. The third station also has hydraulically activated rollers that bend two flaps over the upper surface of the brick. At the fourth station, stapling mechanisms place staples through the sheet metal flaps with the ends of the staples projecting into recesses in the brick. Finally, at the last station, anvils are pressed on the staples and the metal over the recesses, depressing the staples and sheet metal into the recesses so that the tops of the staples are at least flush with the outer surface of the metal case.

The apparatus just described is adjustable to accept and encase a variety of shapes and sizes of bricks.

This invention provides a metal case for a refractory brick that can be rapidly applied and attached to the brick and thus reduce time and cost.

The metal case fits the brick tightly even though the dimensions of various bricks may vary appreciably and the casing can be applied without sorting of bricks or cases as a result of variation in brick size.

A metal case according to this invention ensures positive engagement with a basic refractory brick, thus preventing the brick from slipping out of the metal case.

The metal case is formed from a single flat metal sheet which is easily handled and stored in a minimum of space.

The metal case according to this invention is easily applied to both fired and chemically bonded brick.

The casing can be applied easily and quickly, either manually or automatically, at a minimum of labor cost and without interference with other production operations.

In accordance with this invention, apparatus is provided for applying successive metal casings to a plurality of successive refractory articles in a continuous operation, wherein means are employed for placing the casing about a brick by a predetermined timed sequence of operations.

This invention comprises apparatus, an article of manufacture and a method of producing same, the preferred form of which is disclosed in the following description and attached drawings. Although the invention is shown and described in detail in connection with metal-clad, burned, basic refractory brick, it is apparent that this invention is not limited thereto. Many of the significant features of this invention apply also to other types of composite blocks.

In the drawings:

FIG. 1 is a partly schematic side elevational view of the brick-cladding apparatus;

FIG. 2 is a partly schematic end elevational view of the brick-cladding apparatus;

FIG. 3 is a perspective view illustrating the placement of the brick on the cladding blank as may be accomplished by the portion of the apparatus shown in FIGS. 4, 5, and 6;

FIG. 4 is a sectional side elevational view taken through the center line of the brick-loading portion of the apparatus;

FIG. 5 is a sectional elevational view taken on the line 5—5 of FIG. 4;

FIG. 7 is a side elevational view with some parts sectioned of the portion of the apparatus which forms the two bottom bends of the cladding blank around the brick;

FIG. 8 is a perspective view illustrating the bending operation as may be accomplished by the portion of the apparatus shown in FIGS. 7 and 9;

FIG. 10 is a side elevational view with some parts sectioned of the portion of the apparatus which forms the two top bends of the cladding blank around the brick;

FIG. 11 is a perspective view illustrating the bending operation as may be accomplished by the portion of the apparatus shown in FIGS. 10 and 12;

FIG. 12 is a sectional elevational view taken along the line 12—12 of FIG. 10;

FIG. 14 is a sectional elevational view taken along the line 14—14 of FIG. 13;

FIG. 15 is a perspective view illustrating the stapling operation as may be accomplished by the portion of the apparatus shown in FIGS. 13 and 14;

FIG. 16 is a sectional view of a portion of the metal-cladded brick taken through the staple after the stapling operation;

FIG. 17 is a sectional view of a portion of the metal-cladded brick taken through the staple after the staple has been depressed;

FIG. 18 is an end elevational view with some parts sectioned of the portion of the apparatus that depresses the staple;

FIG. 19 is a top view with some parts sectioned of the portion of the apparatus that depresses the staple;

FIG. 20 is a perspective view of another embodiment of the cladded brick illustrating an alternative shape of the original metal-cladding blank; and FIG. 21 is a perspective view of another embodiment of the cladded brick illustrating an alternative shape of the original metal-cladding blank.

Figure 6:
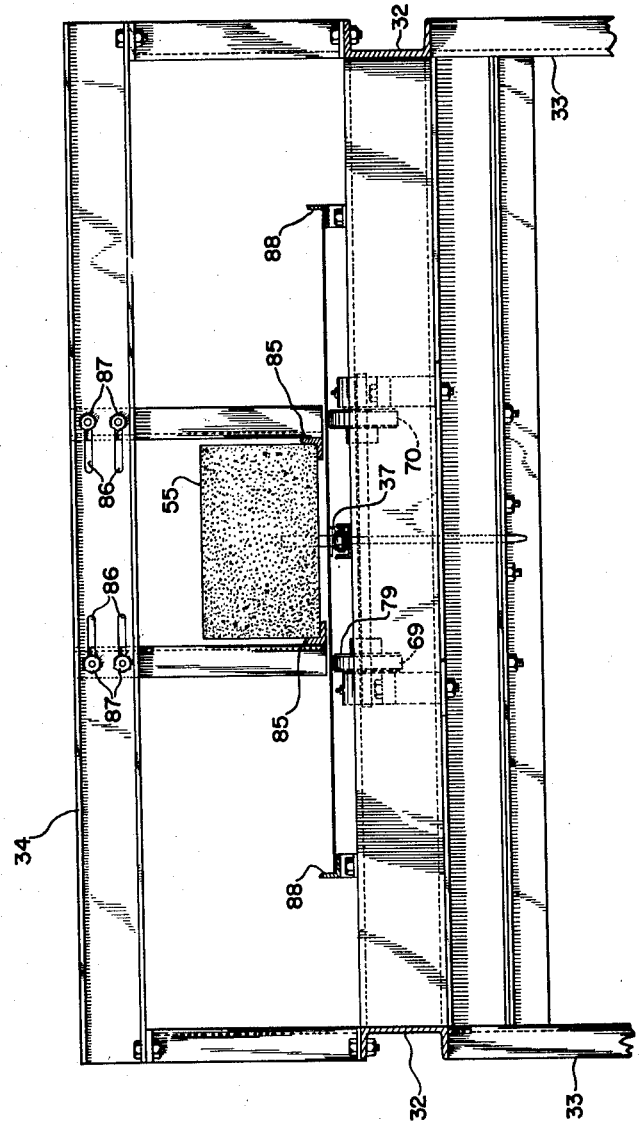
FIG. 6 is a sectional elevational view taken along the line 6—6 of FIG. 4.

Referring to FIGS. 1 and 2, the brick-cladding apparatus has a frame 31 which may be channel iron comprised of longitudinal main frame members 32, supported by upstanding members or legs 33, and connected by a number of transverse members 34. Additional longitudinal frame members 35—35 are secured to the legs 33 and provide rigidity and additional support for various components of the apparatus. The legs 33 may be secured to a plurality of base plates 36—36. The frame 31 supports an endless roller chain-type conveyor 37. Conveyor 37 is provided with projecting attachments 38 located at predetermined spaced points. Suitably mounted on the frame 31 are idler sprocket wheels 39 and 40. An additional idler wheel 41 is mounted by suitable means (shown in greater detail in FIGS. 4 and 5) to transverse frame members 34. At the opposite end of the conveyor 37 is driver wheel 42 affixed to shaft 43 which is rotatably mounted in pillow blocks 44 and 45. Sprocket wheel 46 also affixed to shaft 43 is connected by a chain 47 to sprocket wheel 48. The conveyor 37 is ultimately driven by power unit 49 connected by suitable means such as coupling 50 to an indexing mechanism 51, which rotates sprocket wheel 48. The power unit 49 and indexing drive unit 51 are mounted on a base plate 52 attached to the frame 31. The indexing drive unit 51 is electrically connected to a central circuit (not shown) consisting of a number of limit switches. The limit switches are connected in series so that with each operation of the machine the circuit is completed when all portions of the apparatus performing cladding operations have completed their cycles. Thus the drive mechanism operates intermittently.

A sheet metal feeder 53, is a separate unit with its own motor-clutch drive system actuated electrically by the chain-conveyor indexing mechanism 51.

The brick-cladding apparatus includes five stations which operate essentially simultaneously. The brick and cladding blank orienting station 54 orients the bricks 55 onto the sheet metal cladding blank 56. The first bending station 57 bends the sheet metal upward around the sides of the brick. The brick 55 and metal case 56 are moved to the second bending station 58 where the upwardly projecting flaps of the cladding blanks are bent over the upper surface of the brick. The stapling station 59 places a staple in the two top flaps securing the metal case around the brick. Finally at the dimpling station 60, the staple and surrounding metal are depressed.

As indicated in FIGS. 4, 5, and 6, sprocket idler wheel 41 has a number of teeth 61 to engage roller chain 37. Sprocket idler wheel 41 is fixedly attached to shaft 62 which is rotatably mounted in pillow blocks 63. A hand wheel 64 is attached to a threaded shaft 65 threadedly engaged with block 66 and connected to pillow block 63, and when hand wheel 64 is rotated the conveyor chain 37 is loosened or tightened. Pillow blocks 63 are slidably mounted by suitable means, such as bolts 67 on plate 68, so that idler wheel 41 may be moved longitudinally by rotating hand wheel 64.

Rotation of idler wheel 41, by the roller chain 37, drives two V-belts 69 and 70 which act as a conveyor for the cladding blanks 56. A pulley 71 fixedly attached to shaft 62 is connected by a belt 72 to a pulley 73 which is fixedly attached to a shaft 74. Shaft 74, rotatably mounted in pillow blocks 75 and 76, also has attached thereto two V-belt driver pulleys 77 and 78 for driving V-belts 69 and 70, respectively. The two V-belts 69 and 70 are suspended over the V-belt driver pulleys 77 and 78 and a plurality of idler wheels 79.

The bricks 55 are received from a feed mechanism consisting of a plurality of rollers 80 rotatably mounted on support members 81 and 82. A brick guide 83 keeps the bricks 55 aligned as they move over the rollers 80 and come to rest against plate stop 84 which properly positions the bricks 55 over the chain conveyor 37. Plate stop 84 is adjustably mounted so as to accommodate various widths of bricks.

As the conveyor chain 37 travels through an indexing cycle, the chain projecting attachments 38 push the bricks 55 off the rollers 80 onto angle iron brackets 85 which guide and support the bricks 55 above the cladding blank 56. Brackets 85 are slidably mounted in slots 86—86 in transverse frame member 34 by suitable means, such as bolts 87—87. The provision of slots 86 allows the angle iron brackets 85—85 to be manually adjustable for different sizes and shapes of bricks to be clad.

The sheet metal feeder 53 (shown in FIG. 1) automatically feeds a cladding blank 56 to the V-belt conveyor 69–70. The V-belts 69 and 70 convey the cladding blanks 56 from the sheet metal feeder 53 and position the blanks 56 under the bricks 55. Because of the sizes of pulleys 71 and 73 and V-belt driver pulleys 77 and 78, the V-belts 69 and 70 are driven slightly faster than the conveyor chain 37 to position the cladding blank 56 against the preceding chain-projecting attachment 38. Manually adjustable guide brackets 88—88 position the cladding blanks 56—56 on the V-belts 69 and 70.

FIG. 3 illustrates the positioning of the brick 55 on the cladding blank 56 by the brick and cladding blank orienting station 54 shown in FIGS 4, 5, and 6. The cladding blank 56 comprises a rectangular piece of metal with a plurality of webs 89—89 separated by perforations 90—90. There are four rows of the perforations 90—90 that are spaced on the blank 56 so as to fall on the corners of a brick 55 when the metal blank 56 is wrapped around the brick 55 as shown in FIGS. 8 and 11. The brick 55 may be made of any suitable material, such as dead burned magnesite, chrome ore, olivine or other basic oxides and blends thereof. Between the rows of perforations 90—90 is the area 91, which eventually covers the bottom surface of the brick 14, and the areas 92—92 which eventually cover the lateral surfaces of the brick 55. At the ends of the rectangular blank 56 are end flaps 93 which close over top surface of the brick 55 and nearly meet along the midline of the brick 55 parallel to the long edges of the brick 55 as shown in FIG. 11.

The brick 55 is placed on the area 91 of the blank 56 and, as shown in FIG. 8, the metal is bent along the two centrally located rows of perforations 90—90. The perforations 90—90 reduce the amount of metal along the bend lines of the metal case leaving only the metal of the webs 89—89 to be bent, thus greatly reducing the tendency of the metal to return to its original position after bending or, in other words, greatly reducing "spring back." This feature is important to rapid manufacturing, since it enables the blank 56 to be formed with the brick 55 in place and allows the blank to be bent so as to form corners having extremely small radii. In contrast, a blank without the perforations 90—90 would spring back away from the brick after bending and could not be bent beyond its final bent position because of interference with the brick. The perforations 90—90 are made wide enough that the distance between the corners or dimensions of the brick 55, which determine the location of the bend lines on the webs 89—89 may vary considerably and still allow the bend lines to be located along the rows of perforations 90—90 and on the webs 89—89. As shown in FIGS. 15, 20 and 21, the width of each of the elongated perforations is several times the thickness of the sheet metal comprising blank 56. The slots or perforations 90—90 help the metal case to fit tightly around the brick 55 by allowing for differences in brick dimensions and reducing spring-back.

After the brick 55 has been placed on the blank 56, as shown in FIG. 3, and three sides of the brick 55 are encased by making bends along the two centrally located rows of perforations 90—90, as shown in FIG. 8, the metal is bent along the two outer rows of perforations 90—90 so that the flaps 93—93 close over the top of the brick 55, as shown in FIG. 11. The top of the brick 55 is provided with recesses 94—94 to allow attachment of the metal case to the brick 55 by insertion of staples 95—95 through the flaps 93—93, as shown in FIG. 16. The recesses 94—94 not only allow staples 95—95 to penetrate and secure the flaps 93—93 but also provide a space into which the ends of the staples of 95—95 may project as shown in FIGS. 16 and 17. The projection of the staples 95—95 into the recesses 94—94 prevents the brick 55 from slipping out through the open ends of the ends of the metal case. The recess 94 is molded into the brick and the sides of the recess 94 are slanted inwardly toward the bottom in order to force the ends of the staples 95—95 to turn inwardly toward each other after penetrating the flaps 93—93, as shown in FIG. 17. The staples 95—95 are thus secured firmly in place by having their ends clinched over.

Referring to FIG. 18, depressions 96—96 are placed at the staples 95—95 by an external pressure to the staple 95 and the adjacent area of metal over the recess 94. The depression 96 may be placed at the staples 95—95 by the stapling machine or by a suitably shaped, hydraulically activated die or hammer. The top of the staple 95 is forced below, or at least flush with, the level of the outside surface of the flaps 93—93. The depressions 96—96 also aid to positively lock the metal case in position on the brick 55, since they protrude into the recesses 94—94. In addition, the depressions 96—96, by allowing the staples 95—95 to be positioned within, i.e., below or flush with the outer surface of the metal case, permit placing the composite blocks on top of one another in uniform and level stacks, fitting compactly against one another.

Figure 9:
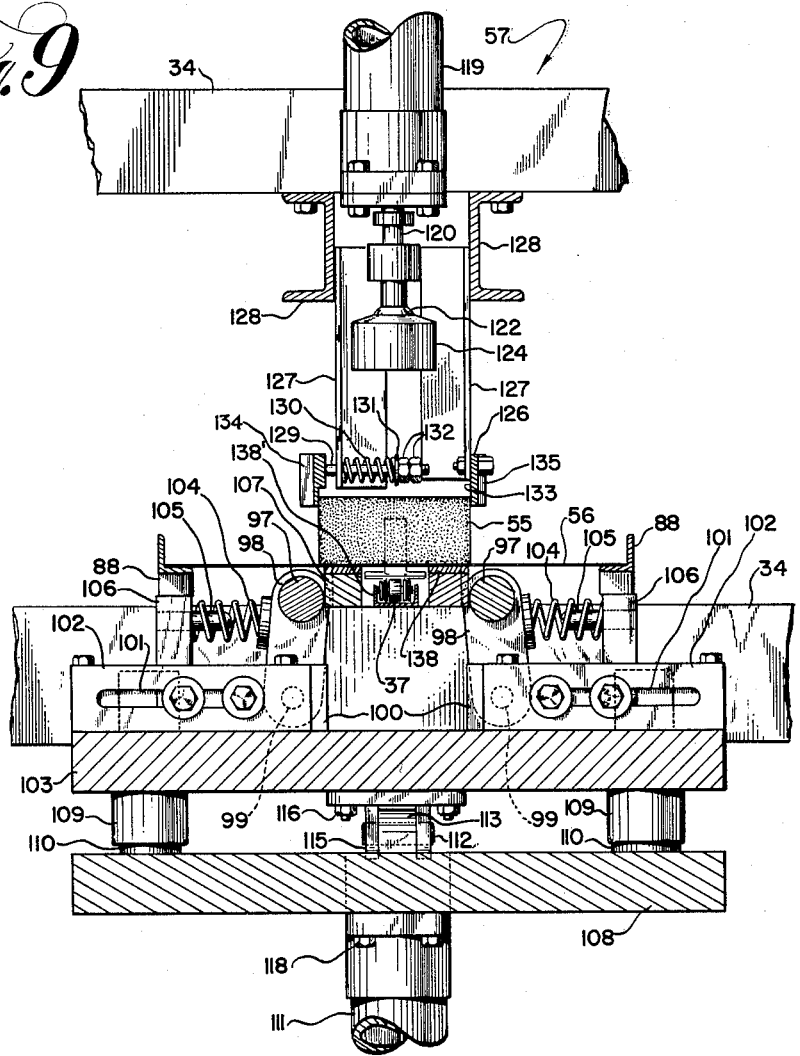
FIG. 9 is a sectional elevational view taken along the line 9—9 of FIG. 7.

Referring to FIGS. 7, 8, and 9, the first bending station 57 forms the two bottom bends in the cladding block 56. The bend rollers 97—97 are rotatably mounted in support arms 98—98 pivotally supported by pins 99—99. Pins 99—99 are secured in support members 100—100 slideably mounted in slots 101—101 of metal blocks 102—102. Support members 100—100 may be manually adjusted to accommodate the various sizes and shapes of bricks to be clad. Metal blocks 102—102 are fastened to a movable die plate 103. Roller compression springs 104—104 mounted on pins 105—105 affixed to vertical projections 106—106 of support members 100, push against roller support arms 98—98, forcing the bend rollers 97—97 against adjustable brick support rails 107—107. The lower fixed die plate 108 is attached to transverse frame members 34—34 and the top or movable die plate 103 has guides 109—109 which slide on the die set posts 110—110 mounted on fixed die plate 108. The lower hydraulic cylinder 111 is attached to the movable die plate 103 by a pin 112 through the end 113 of the hydraulic cylinder rod 114 and a U-shaped member 115 which is bolted to die plate 103 by suitable means, such as bolts 116—116. Hydraulic cylinder 111 is supported by a cylinder guide 117 attached to fixed die plate 108 by bolts 118—118.

During operation of the station 57, the hydraulic cylinder 111 moves the movable die plate 103 and, consequently, the rollers 97 upward and against the cladding blank 56 forming the two bottom bends of the metal case, as shown in FIG. 8.

Threadedly engaged to the top hydraulic cylinder 119 having a rod 120 with a threaded end 121 is a ball 122 which fits into the socket 123 of a cylindrical clamp 124. Activation of the hydraulic cylinder 119 moves the cylindrical clamp 124 against the top surface of brick 55 clamping the brick in place during the bending operation. The ball 122 and socket 123 allow universal action of the cylindrical clamp 124 so that it will have a surfaceto-surface contact with a brick whose upper surface may may be slanted in any direction.

Two brick guide brackets 125 and 126 position the brick 55 during the chain indexing cycle and are supported by vertical members 127—127 attached to horizontal members 128—128 which may be adjusted transversely for various widths of bricks in slots (not shown) on transverse members 34—34. One guide bracket 125 is attached to rods 129—129, each encircled by a spring 130 which bears against the inner surface of vertical members 127 and a washer 131 held in place on rods 129—129 by suitable means, such as nuts 132. The other guide bracket 126 is fixed in position to form a reference surface 133 which positions the brick 55 properly in the station. Both guides 125 and 126 have flared ends 134 and 135, respectively, to permit the brick 55 to enter the station.

The cladding blank 56 is positioned under the brick 55 by two manually adjustable guide brackets 88—88 and a stop plate 136 fastened to each guide by a bolt 137. The brick 55 and cladding blank 56 slide on adjustable brick support rails 107—107 through the machine. Attached to the top of brick support rails 107—107 are hardened plates 138—138 to minimize wear caused by sliding bricks.

Roller chain conveyor 37 is prevented from sagging as it passes through the machine by a chain support channel 138' attached to various transverse members 34—34 of the frame.

Referring to FIGS. 10, 11, and 12, the second bending station 58 forms the two top bends in the cladding blank, as illustrated in FIG. 11. The partially clad brick 55 is moved by the conveyor chain 37 along the brick guides 107—107 and positioned in the station 58 by brick clamps 139—139. The brick clamps 139—139 are attached to rods 140—140 slideably mounted in spring mounts 141—141 and provided with suitable stops, such as nuts 142—142. Springs 143—143, each bearing against a brick clamp 139 and a spring mount 141, keep the brick clamps 139—139 against the metal casing as the station 58 operates.

Two bend roller assemblies 144—144 are each comprised of a bend roller 145, rotatably mounted in two bearing housings 146—146, each of which is attached to a rod 147 slideably supported in mounting plate 148 and provided with a washer 149 and nut 150 to act as a stop. Compression springs 151—151, bearing on the bearing housing 146 and mounting plate 148, are provided to force the bend rollers 145—145 in the downward position. The mounting plate 148 may be adjusted diagonally for different shapes of brick by the provision of slots 152—152, through which pass bolts 153—153, and attach to vertical extensions 154—154 of sliding plates 155—155. Sliding plates 155—155 are provided with projections 156—156 (shown in FIG. 12 and omitted in FIG. 10 for clarity) each linked to a bifurcated end 157 of hydraulic cylinders 158—158 by a pin 159, move back and forth on wear plates 160—160 and are kept in position by a plurality of roller guides 161—161. The roller guides 161—161 and wear plates 160—160 are attached to vertical adjustment supports 162—162. The vertical adjustment supports 162—162 may be manually adjusted in a vertical direction to accommodate various brick heights by the provisions of slots 163—163 through which pass a plurality of bolts 164—164 to affix the vertical adjustment supports 162—162 to the transverse frame members 34—34. The hydraulic cylinders 158—158 actuate the sliding plates 155—155 to move the bend roller assemblies 144—144 in a horizontal direction against brick 55, so that the bend rollers 145, brick clamp 139, and top flap 93 reach the positions as designated in FIG. 12 by the dotted areas $a$, $b$, and $c$. The spring-loaded brick clamps 139—139 compress the cladding blank 56 against the brick 55 to provide a tight fit during the second bending operation.

The compression springs 151—151 bearing on the bend roller-bearing housings 146—146 keep the bend rollers 145—145 forced against the cladding to form the two top bends.

Attached to the threaded end 163' of the rod 164' of the top hydraulic cylinder 165, is a ball 166 which fits into a socket 167 of a cylindrical clamp 168. The top hydraulic cylinder 165 is activated at the beginning of the station's cycle and holds the partially clad brick 55 in position as the bend rollers 145—145 and brick clamps 139—139 are moved toward the center of the machine. When the bend rollers 145 and brick clamp 139 reach the positions, as shown in FIG. 12 by the dotted areas $a$ and $b$, the cylindrical clamp 168 is retracted upward out of the way so that the flaps 93—93 may be forced in the direction of the arrow $d$ to the position of the dotted area $e$ and the bend rollers 145 advance to the position shown by the dotted area $f$. The completed operation is illustrated in FIG. 11.

As indicated by FIGS. 13, 14, 15, and 16, the stapling staiton 59 automatically forms and places the staples 95—95 into the flaps 93—93 of the cladding blank 56, which has been wrapped around the brick 55 as shown in FIG. 15. The sides of the recess 94 clinch the staple 95, as shown in FIG. 16, to provide secure retention of the metal case to the bricks.

The stapling machines 169—169 (which are commercially available units and shown in dotted outline such as a Bostitch metal stitching machine) are positioned so that the metal-wrapped brick 55 may be moved upward to the stapling machines 169—169 from the roller chain conveyor 37 on the brick rails 170—170 by hydraulic cylinders 171 and 172. Each of the hydraulic cylinders, having cylinder rods 173—173 and cylinder rod connections 174—174, are attached to a roller assembly 175 by a pin 176 through cylinder rod connection 174, the pin 176 being fixed to a plate 177 of roller assembly 175 by bolts 178. Each roller assembly 175 comprises a plate 177 attached to two roller mounts 179—179 having a plurality of rollers 180—180 rotatably mounted on pins 181—181 through the roller mounts 179—179 and held in place by nuts 182—182. The rollers 181—181 are free to move vertically in roller guides 183—183. A rod 184 is rotatably mounted in a pillow block 185, the pillow block 185 being affixed to one of the plates 177. Two blocks 186—186 support one end of two channel irons 187—187 and are affixed by means of bolts 188—188 to each end of rod 184. The opposite ends of the channel irons 187—187 are affixed to each end of a rod 189 by bolts 190—190 passing through blocks 191—191. Rod 189 is free to slide on the top surface 192 of support 193 affixed to the top of the other plate 177. The channel irons 187—187 support the slide rails 170—170 and brick guides 194—194.

On each side of the stapling machines 169—169 are brick pressure bars 195—195 and brick stops 196—196 adjustable transversely to accommodate various sizes and shapes of bricks (as seen in FIG. 14 the brick pressure bars, brick stops and corresponding parts are moved outward to accommodate a larger size brick than the actual brick shown in the drawing). The brick pressure bars 195—195, which slide on the lower surface 197 of brick stop 196 and the surface 198 of pressure bar guides 199, are attached to rods 200—200 having suitable stops such as nuts 201—201 adapted to bear against a mounting plate 202 when the brick pressure bars 195—195 are urged toward the brick by spring 203—203.

Figure 13:
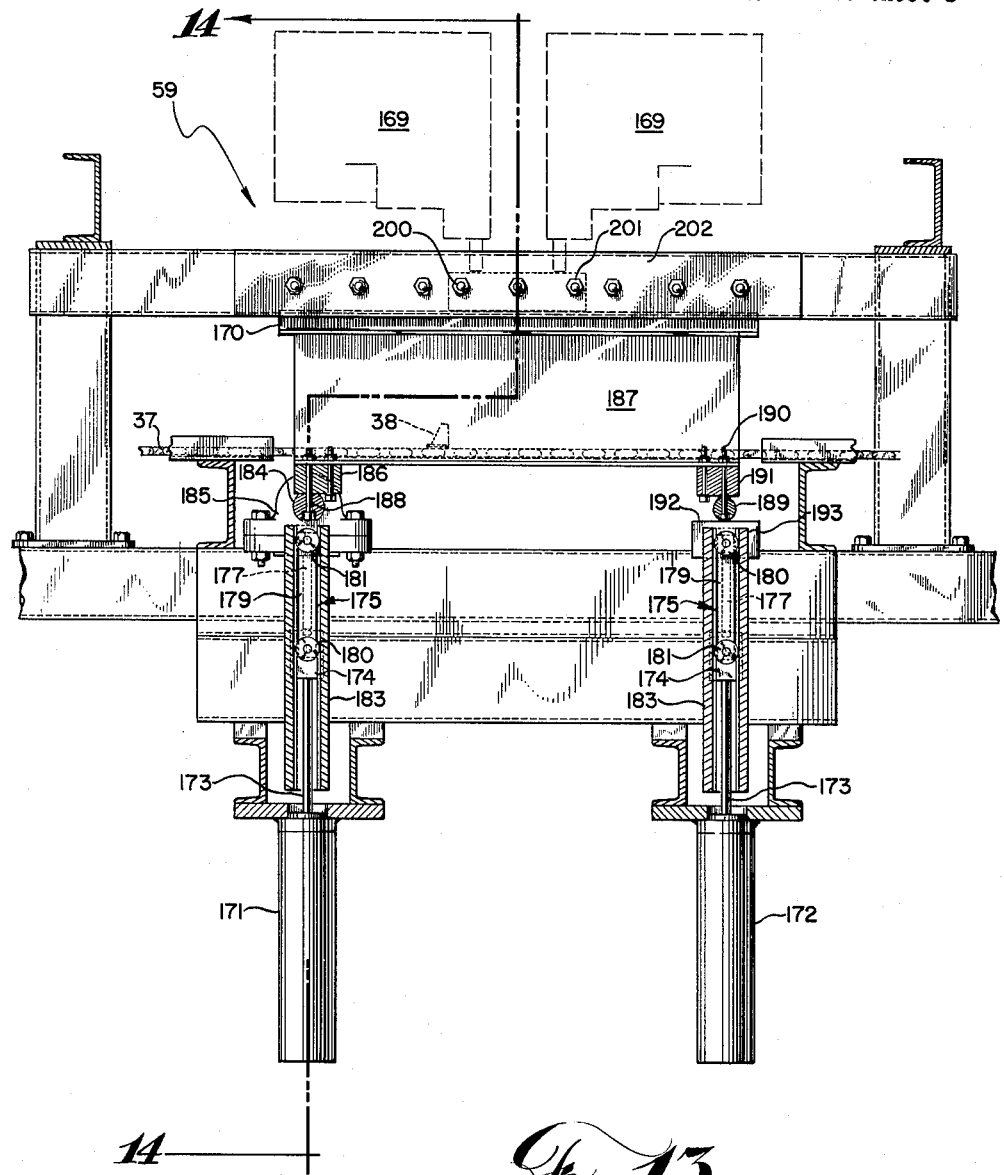
FIG. 13 is a side elevational view with some parts sectioned of the portion of the apparatus that staples the metal case.

The stapling station 59, as shown in FIGS. 13 and 14, is illustrated with the brick 55 in the elevated position ready for stapling. During operation of the stapling station 59, the roller chain 37 moving the brick 55 on the slide rails 170 indexes the metal wrapped brick 55 in proper position under the stapling machines 169—169. The hydraulic cylinders 171 and 172 are activated, and, by means of the previously described roller assemblies 175—175 and channel irons 187—187, the brick 55 is moved upward until the metal case 56 contacts the diagonal surfaces 204—204 of the brick pressure bars 195—195. The metal case 56 has a slight tendency to spring away from the brick due to the fact that when the two previous bends are formed, the metal is formed around the brick and cannot be bent further than its final position to compensate for "spring-back." The pressure bars 195—195 are forced outward by the rising brick 55 pushing against the slanted surfaces 204—204 compressing springs 203—203 so that pressure bars 195—195 force the metal case 56 snugly around the brick 55. The upward travel of the brick is halted when the top flaps 93 of the metal case 56 contacts the lower surfaces 205—205 of brick stops 196—196. The brick stops 196—196 not only press on the top flaps 93—93 of the cladding blank 56 so that the metal is held tightly around the brick, but also ensure that the top surface of the metal-wrapped brick 55 is properly referenced for application of the staples 95—95. Thus, if the height of the brick to be encased is greater at one end than at the other (that is, if the brick is key-shaped or has the top surface slanted as it lays on the slide rails) the higher end of the brick will contact the brick stops 196—196 first, and since the hydraulic cylinders 171 and 172 operate independently and the channel irons 187—187 are pivotally mounted at one end and slidably mounted at the other, the other end of the brick is continued upward until the top surface of the metal-wrapped brick is flush against the brick stops 196—196. With the top surface of the metal-wrapped brick properly placed against the stapling machines 169—169, a staple 95—95 is inserted into the top flaps 93—93 of the metal to hold the metal blank 56 in position on the brick 55.

After the stapling machines 169—169 have placed the stapling 95—95, as illustrated in FIGS. 15 and 16, the metal-wrapped brick 55 is returned to the conveyor 37 by retraction of the hydraulic cylinders 171 and 172. The brick 55 with its stapled metal case is ready to move to the next station.

Referring to FIGS. 17, 18, and 19, the dimpling station 60 depresses the staples 95—95 and part of the sheet metal flaps 93—93 over the recesses 94—94 forming dimples 96—96 so that tops of the staples 95—95 are moved down at least enough to be flush with the outer surface of the metal case, as shown in FIG. 17.

The dimple 96 is made by a tool-holder assembly 206 comprising a tool 207 supported by a tool holder 208, the tool holder 208 being attached to a tool holder arm 209. Tool holder arm 209 is pivotally mounted on an arm-support shaft 210 and is adjustable longitudinally thereon. Arm-support shaft 210 may also be manually adjusted vertically for different sizes and shapes of bricks by rotation of adjusting screw 211 engaged with arm-support shaft 210 attached to hand wheel 212 and threadedly engaged with adjusting screw mount 213. Arm-support shaft 210 is also attached to each end by suitable means such as bolts 214 and 215 to sliding supports 216—216 which slide against vertical frame risers 217—217 and each held in place by a guide pin 218. The adjusting screws 211—211 pass through slots 219—219 on arm-support shaft 210 and the bolt 215 which attaches the arm-support shaft 210 to one of the sliding supports 216 also passes through a slot 220 on arm-support shaft 210. The slots 219—219 and 220 allow the arm-support shaft 210 to be adjusted diagonally for bricks having their top surface slanted.

The metal-wrapped stapled bricks are moved into the dimpling station 60 by the indexing conveyor chain 37 pushing the bricks along slide rails 107 and centered under the dimpling tool assemblies 206—206 by brick guides 221—221. Hydraulic cylinders 222—222, each having a threaded rod 223 threadedly engaged with a ball 224 fitting in the socket 225 of a hammer 226 are positioned directly over each tool holder 208 and upon activation each hammer 226 strikes a tool holder 208 forcing the associated tool 207 onto the staple 95. As shown in FIG. 18, the tool-holder assembly 206 is in the depressed position. The dotted area g of FIG. 18 indicates the starting or up position of the tool holder assembly 206. The tool-holder assemblies 206—206 are returned to starting position g by resilient means such as return springs 227—227 each attached to arm-support shaft 209 and spring-support rod 228 mounted on vertical frame risers 217—217.

FIG. 19 is a view of the dimpling station 60 with one of the hydraulic cylinders 222 and its supporting structure broken out to illustrate a top view of the tool-holder assembly 206. The return spring 227 has been removed and spring-support rod 228 broken out. As can be seen in FIG. 19, the brick guides 221—221 have a tapered corner 229 to allow any bricks that are slightly crooked on the conveyor 37 to be straightened on the conveyor 37.

FIGS. 20 and 21 show other embodiments of the invention having alternative shapes for the end flaps 230—230 and 231, 232 along the opening 233 and 234. The end flaps 230—230, which almost meet, form two of the edges of the opening 233 as shown in FIG. 20. The opening 233, would provide a longer leak path for any gas which might tend to escape from a commercial furnace. The opening 234 formed by the edges of the flaps 231 and 232, as shown in FIG. 21, also provide a longer leak path for the gases of a furnace. In addition, the shape of the flaps 231 and 232 is particularly adapted to larger refractory bricks in that the staples 95—95 are placed in such a location that the dimensions of the brick 55 may vary considerably without requiring the use of a different size of staple. The opening 234 formed by edges of the flaps 231 and 232 has a portion parallel to the long axis of the brick 55 and distinguished from the short portion of the opening 234 perpendicular to the long axis of the brick 55. Thus, it is apparent that change in width or thickness of the brick 55 causes the width of the opening 234 that is parallel to the long axis of the brick 55 to vary considerably but does not result in a change in that portion of opening 234 that is perpendicular to the long axis of the brick 55. The staples 95—95 bridge the portion of opening 234 that is perpendicular to the long axis of brick 55 and the size of the staple 95—95 need not vary with the portion of the opening 234 that is parallel to the long axis of brick 55, but remains the same for many variations in sizes.

The blank 56 may also be shaped so that the flaps 93 meet and fasten on a narrow side of the brick 55.

Refractory bricks are made in a large number of shapes and sizes. Some of the shapes are referred to as "arches," "wedges," "keys," etc. The size, for example, may vary from a length of 6 inches to 22½ inches, a width of 3 inches to 9 inches, and a thickness of 2 inches to 5 inches. The particular brick shown in the drawings is called a "straight."

A typical example of a composite block as shown in FIG. 3 is a rectangular brick 9 inches long, 4½ inches wide and 3 inches thick. The metal blank 56 is made from 20-gauge steel and the slots or perforations 90—90 preferably have widths of about ⅛ inch to 7/16 inch to allow for variations in the location of the line along which the metal is bent. The distance between the perforations 90—90 or length of the webs 89—89 may be about ⅛ inch to ½ inch; however, ¼ inch is the optimum, considering strength, brick protection, and ease of bending. The recesses 94—94 of this size of brick are located about 1 inch from the ends of the brick having a length of about 1⅜ inches which is perpendicular to the long axis of the brick 56, a depth of about 15/32 of an inch and a width of about ¼ inch. The preferred size of the staples 95—95 is a staple of No. 18 gauge wire, about 1 inch wide having its ends about 7/16 inches long. A staple of this size is heavy enough to penetrate metal as thick as 20-gauge steel comprising the metal case, wide enough to bridge various widths of the openings between the end flaps 93—93 and the points or ends are long enough to protrude into the recess 94 and strike the bottom of the recess 94 locking the metal case in place on the brick 55.

It will be understood, of course, that, while the forms of the invention herein shown and described constitute preferred embodiments of the invention, it is not intended herein to illustrate all of the possible equivalent forms or ramifications of the invention. It will also be understood that the words used are words of description rather than of limitation and that various changes may be made without departing from the spirit or scope of the invention herein disclosed.

What is claimed is:

1. A composite refractory block for lining furnaces and the like comprising a refractory brick having four flat side surfaces arranged so that the brick is of substantially rectangular cross sectional shape and said side surfaces intersect in four sharp edges, a case enclosing said brick comprising a single integral sheet of sheet metal folded around said side surfaces and edges so as to form four flat side walls lying flat against and parallel to said flat surfaces, each of said side walls joined to adjacent side walls by arcuate corners extending around said sharp edges of said brick, said case having only elongated apertures in alignment with one another in rows restricted to said arcuate corners, said apertures being characterized by straight substantially parallel sides and rounded ends thereby being substantially of elongated oval form, said rows being spaced one from another a distance equal to at least the width of the related side of the brick, the width of each of said apertures being several times greater than the thickness of said sheet of metal whereby said apertures extend into the side edges of said flat side walls and enable the case to be tightly folded about the brick to conform to the dimensions of the sides of the brick even though the center-to-center distance between adjacent rows of apertures may not be exactly the lateral spacing between adjacent ones of said edges of the brick, opposite end portions of said sheet of metal overlying one of said surfaces so as to comprise one of said walls, the ends of said end portions being spaced from one another, said one surface being formed with recesses having opposing side surfaces converging inwardly toward the center of said brick, depressed areas formed in opposing edge portions of said end portions and extending into said recesses, and staples extending through said depressed areas and terminating within said recesses adjacent said opposing side surfaces so as to secure said end portions together and so that said staples do not project outwardly beyond said end portions.

2. The block as defined in claim 1, wherein one of said end portions is formed with a rectangular notch, the other of said end portions including a rectangular tongue extending into said rectangular notch, said staples extending between opposing side edges of said notch and tongue whereby the sheet of metal may be bent around and secured to bricks of slightly different sizes.

3. A method of producing a metal encased refractory article comprising the steps of forming a brick of refractory material having a rectangular cross section and at least one recess in one side surface thereof so that the recess has side walls sloping relative to said one side surface, forming four parallel rows of elongated perforations in a blank rectangular sheet of metal having free ends so that the perforations each have a width several times the thickness of said sheet of metal and so that said rows are spaced from one another substantially the same distance as the lateral spacing between the edges of the brick that define the four side surfaces of the brick, positioning another side surface of said brick on said blank so as to have adjacent side edges of the brick substantially centered over the two innermost rows of perforations, bending at the intermediate perforations, and in a single operation in one direction, the portions of said blank of sheet metal that are outward of the intermediate perforations so as to present opposed side portions of the blank flat against the two outer sides of the brick that are adjacent said one side surface thereof and to present the remaining two rows of perforations over the remaining two edges of the brick, thereafter bending at the remaining perforations the remaining portions of said sheet metal toward one another flat against said one side surface in a single operation at right angles to the first named direction to bring adjacent one another the free ends of the sheet metal at said one side surface of the brick having said recess therein, and thereafter forcing opposing legs of a generally U-shaped staple through the free ends of the sheet metal while bending into said recess the portion of the sheet metal having the staple applied thereto so that the free ends of said legs contact said sloping side surfaces and said legs are bent laterally to secure said free ends together and to said brick.

References Cited in the file of this patent

UNITED STATES PATENTS

| | | |
|---|---|---|
| 514,233 | Kubach | Feb. 6, 1894 |
| 1,161,797 | Bohlman | Nov. 23, 1915 |
| 1,776,564 | Meldrum | Sept. 23, 1930 |
| 1,949,079 | Loeffler | Feb. 27, 1934 |
| 1,955,663 | Wendell et al. | Apr. 17, 1934 |
| 2,216,813 | Goldschmidt | Oct. 8, 1940 |
| 2,232,762 | Batcheller | Feb. 25, 1941 |
| 2,282,482 | Koenig | May 12, 1942 |
| 2,289,911 | Heuer | July 14, 1942 |
| 2,346,591 | LaPlace | Apr. 11, 1944 |
| 2,406,559 | Oakes | Aug. 27, 1946 |
| 2,529,313 | Sanders | Nov. 7, 1950 |
| 2,627,153 | Stencil | Feb. 3, 1953 |
| 2,669,116 | Erickson | Feb. 16, 1954 |
| 2,736,187 | Coffman et al. | Feb. 28, 1956 |
| 2,791,116 | Heuer et al. | May 7, 1957 |
| 2,915,893 | Wilkins | Dec. 8, 1959 |

FOREIGN PATENTS

| | | |
|---|---|---|
| 638,767 | Great Britain | 1950 |